United States Patent [19]
Sun et al.

[11] Patent Number: 5,359,308
[45] Date of Patent: Oct. 25, 1994

[54] VEHICLE ENERGY MANAGEMENT SYSTEM USING SUPERCONDUCTING MAGNETIC ENERGY STORAGE

[75] Inventors: Xiaoguang Sun, King of Prussia; Mark S. Colyar, Newtown, both of Pa.

[73] Assignee: AEL Defense Corp., Lansdale, Pa.

[21] Appl. No.: 143,804

[22] Filed: Oct. 27, 1993

[51] Int. Cl.⁵ .................... H01F 1/00; B60K 1/00; H02P 1/00
[52] U.S. Cl. ..................... 335/216; 363/14; 320/4; 320/61; 180/65.2; 180/65.3; 318/139; 318/382; 318/376
[58] Field of Search .............. 363/14; 335/216; 180/65.2, 65.3, 65.4, 65.8; 320/4, 61, 62, 64; 318/139, 382

[56] References Cited

U.S. PATENT DOCUMENTS

| | | | |
|---|---|---|---|
| 3,842,287 | 10/1974 | Nakamura | 290/16 |
| 3,888,325 | 6/1975 | Reinbeck | 180/65 |
| 4,042,056 | 8/1977 | Horwinski | 180/65 |
| 4,119,862 | 10/1978 | Gocho | 290/17 |
| 4,122,512 | 10/1978 | Peterson | 363/14 |
| 4,187,436 | 2/1980 | Etienne | 290/27 |
| 4,199,037 | 4/1980 | White | 180/65 |
| 4,309,620 | 1/1982 | Bock | 290/4 |
| 4,318,449 | 3/1982 | Salisbury | 180/65 |
| 4,908,553 | 3/1990 | Hoppie | 318/382 |
| 4,912,443 | 3/1990 | Heyne et al. | 335/216 |
| 4,923,025 | 5/1990 | Ellers | 180/65 |
| 5,006,672 | 4/1991 | Prueitt et al. | 174/125 |
| 5,159,261 | 10/1992 | Kim | 323/360 |
| 5,160,911 | 11/1992 | Herring | 335/216 |
| 5,172,784 | 12/1992 | Varela, Jr. | 180/65 |

FOREIGN PATENT DOCUMENTS

| | | | |
|---|---|---|---|
| 1270705 | 10/1989 | Japan . | |
| 4295201 | 10/1992 | Japan . | |
| 2030389 | 4/1980 | United Kingdom | 363/14 |

OTHER PUBLICATIONS

"Will Superconducting Magnetic Energy Storage Be Used on Elect. Utility Systems?", William Hassenzohl, IEEE Trans. on Mag., vol. MAG-11, No. 2, Mar. 1975.

*Primary Examiner*—Leo P. Picard
*Assistant Examiner*—Stephen T. Ryan
*Attorney, Agent, or Firm*—Seidel, Gonda, Lavorgna & Monaco

[57] ABSTRACT

An energy management system for a hybrid internal combustion and electric vehicle provides a highly energy-efficient and yet highly agile hybrid vehicle. The vehicle includes an internal combustion engine, an electric motor/generator and at least one electric storage battery for storing and dispensing energy, all operating in conjunction with an energy storage system including a sensing and control unit and a superconducting magnetic energy storage device. The sensing and control unit is connected to the motor/generator, the battery and the storage device, and has as an input at least one sensor signal representative of a preselected sensed vehicle condition. The sensing and control unit selectably charges the battery at a charging rate compatible with maximum battery efficiency, discharges the battery at a discharging rate also compatible with maximum battery efficiency, causes the storage device to store energy from the motor/generator, and causes the storage device to supply stored energy to the motor/generator, in response to the sensed vehicle condition.

18 Claims, 3 Drawing Sheets

VEHICLE ENERGY MANAGEMENT SYSTEM USING SUPERCONDUCTING MAGNETIC ENERGY STORAGE

FIELD OF THE INVENTION

The present invention relates to managing and controlling the generation, storage and consumption of energy in hybrid internal combustion and electric vehicles.

BACKGROUND OF THE INVENTION

Internal combustion engine vehicles are by far the most common road vehicles in the world today. In addition to road vehicles, many other types of vehicles and equipment, such as cranes, bulldozers, electric generators, and so forth, are powered by internal combustion engines. Internal combustion engine vehicles offer undeniable advantages vehicles powered by other types of engines. Nonetheless, they suffer from undeniable disadvantages as well. Their exhaust is a major contributor to air pollution, particularly in densely-populated areas. The petroleum-based fuel they consume is unrenewable and, in time, supplies of petroleum will be depleted.

Alternatives to petroleum-consuming internal combustion engines have been proposed, and have been used in vehicles prior to the present invention. Renewable fuels, such as organic fuels derived from ethanol, are used as a supplement or alternative to gasoline in internal combustion engines. Although the energy output of such fuels is lower than gasoline, they burn more cleanly and do not produce oxides of nitrogen, which are a major component of automobile emissions. They are also renewable.

Electrically-powered vehicles have also been developed. Electric trains and trolleys, for example, have long been in use, and electric cars and trucks were produced and used many years ago. Electric vehicles are quiet and are very "clean" in that they produce no emissions at all. However, electric vehicles have a major drawback: they must at all times be connected to a source of electricity. This is not a problem for electric trains and trolleys, which are normally confined to a given route or right-of-way. An electrified overhead catenary is suspended above the tracks, and a pantograph (or current collector) on the vehicle makes contact with the catenary, connecting traction motors in the vehicle with the electrified catenary. For cars and trucks, however, which have no fixed route or right of way, this solution is impossible. As a result, electric cars and trucks rely on electric storage batteries to provide electricity to their traction motors.

Purely electric cars and trucks, however, are not ideal, either. The batteries tend to be heavy and bulky, adding weight to the vehicle and consuming space that might otherwise be used for passengers or cargo. Batteries also have a limited capacity, which limits the range of an electric vehicle. Batteries also need to be recharged, and over time will lose their ability to hold a charge. Batteries thus have a finite life, and must be replaced at the end of that life. Research has focused on reducing battery size and weight and on increasing battery life, but batteries are still a major problem, not the least of which is that fossil fuel must be burned in order to generate the electricity to charge the batteries in the first place. This leaves purely electric vehicles in the awkward position of contributing to air pollution while at the same time trying to avoid it.

Alternatives to batteries, such as solar panels, have been proposed to reduce dependence on batteries, but solar panels require abundant sunshine in order to be viable, and are not an option in many cases. Further research has focused on conversion of the direct current battery energy into DC pulse or AC schemes to power lighter, less expensive traction motors to compensate for some of the above drawbacks, but the conversion systems are complex and expensive.

Hybrid vehicles, which use energy from both electric batteries and an internal combustion engine, appear to offer a good compromise between purely electric vehicles and purely internal combustion vehicles. Hybrid vehicles tend to have smaller, lighter and less expensive batteries and a relatively long range than pure electric vehicles. They also tend to have relatively small (e.g., 30 hp) internal combustion engines, so they use less gasoline and emit fewer pollutants.

Prior to the present invention, in such vehicles the engine is operated at a constant speed for maximum efficiency. Propulsion of the vehicle is achieved by using an electric traction motor to power the drive wheels, while the internal combustion engine drives a generator to keep the batteries charged. By running the engine at a constant speed, fuel consumption and emissions are optimized. However, this approach demands the rapid draw of large amounts of current from the batteries during ignition and acceleration, which is inefficient because batteries work efficiently only when charged or discharged very slowly.

It has been proposed to use an alternative energy storage device to supplement the electrical output of a battery or a constant-speed internal combustion engine in a hybrid vehicle. U.S. Pat. No. 5,160,911, which is primarily directed to the structure of a toroidal superconducting magnetic energy storage unit, mentions that the disclosed storage unit can be used to augment the electrical output of a battery or a constant speed internal combustion engine in a hybrid vehicle. Energy stored in the storage unit can be used for acceleration, since neither a constant speed internal combustion engine nor a battery are able to provide the energy rapidly enough to adequately accelerate the vehicle. Thus, in the scheme briefly described in U.S. Pat. No. 5,160,911, the storage unit provides electrical output in addition to the output demanded from the battery during acceleration. Although U.S. Pat. No. 5,160,911 is silent on the point, presumably the storage unit only supplies electrical output after the maximum output of the battery has been reached. U.S. Pat. No. 5,160,911 also mentions that the storage unit can store energy recovered during regenerative braking of the vehicle, but does not explain how the energy is recovered or stored. Presumably, the storage unit is charged after the battery has been fully charged.

None of the prior attempts at designing a hybrid vehicle appear to have recognized, let alone addressed, the effect of their approaches on battery efficiency. For example, in the system suggested by U.S. Pat. No. 5,160,911, there is no disclosure of managing the energy draw from the battery, so that the battery presumably is rapidly discharged on acceleration and then rapidly charged during braking. Batteries do not operate most efficiently under such conditions.

The present invention improves battery efficiency, and therefore overall vehicle energy efficiency, by providing a superconducting magnetic energy storage device in conjunction with an energy management system in a hybrid vehicle to efficiently store and dispense energy. With the present invention, the state of a plurality of vehicle parameters, such as acceleration and braking, battery charge, and energy stored in the superconducting magnetic energy storage device, are sensed and used to control operation of the superconducting magnetic energy storage device. Depending on the state of the sensed parameters, the storage device is controlled to perform one or a combination of the following: 1) draw energy slowly from the battery, 2) slowly charge the battery, 3) supply burst energy to an electric machine to help drive the vehicle, and 4) store energy received from the electric machine during braking of the vehicle.

Most passenger cars do no require more than 20 hp for cruising at 55 mph. Greater power is needed only for acceleration and climbing hills. The present invention combines a small (and therefore lighter) internal combustion engine with an electric motor/generator and an energy storage device that recovers kinetic energy during vehicle braking and reuses it for acceleration and burst power. The present invention makes possible a highly energy-efficient, yet highly agile, hybrid vehicle.

SUMMARY OF THE INVENTION

The present invention is directed to an energy management system for a hybrid internal combustion and electric vehicle having an internal combustion engine, an electric motor/generator and at least one electric storage battery for storing and dispensing energy. The system comprises a sensing and control unit and a superconducting magnetic energy storage device. The sensing and control unit is connected to the motor/generator, the battery and the storage device, and has as an input at least one sensor signal representative of a preselected sensed vehicle condition. The sensing and control unit selectably charges the battery at a charging rate compatible with maximum battery efficiency, discharges the battery at a discharging rate also compatible with maximum battery efficiency, causes the storage device to store energy from the motor/generator, and causes the storage device to supply stored energy to the motor/generator, in response to the sensed vehicle condition.

DESCRIPTION OF THE DRAWINGS

For the purpose of illustrating the invention, there is shown in the drawings a form which is presently preferred; it being understood, however, that this invention is not limited to the precise arrangements and instrumentalities shown.

DESCRIPTION OF THE INVENTION

Figure 1:
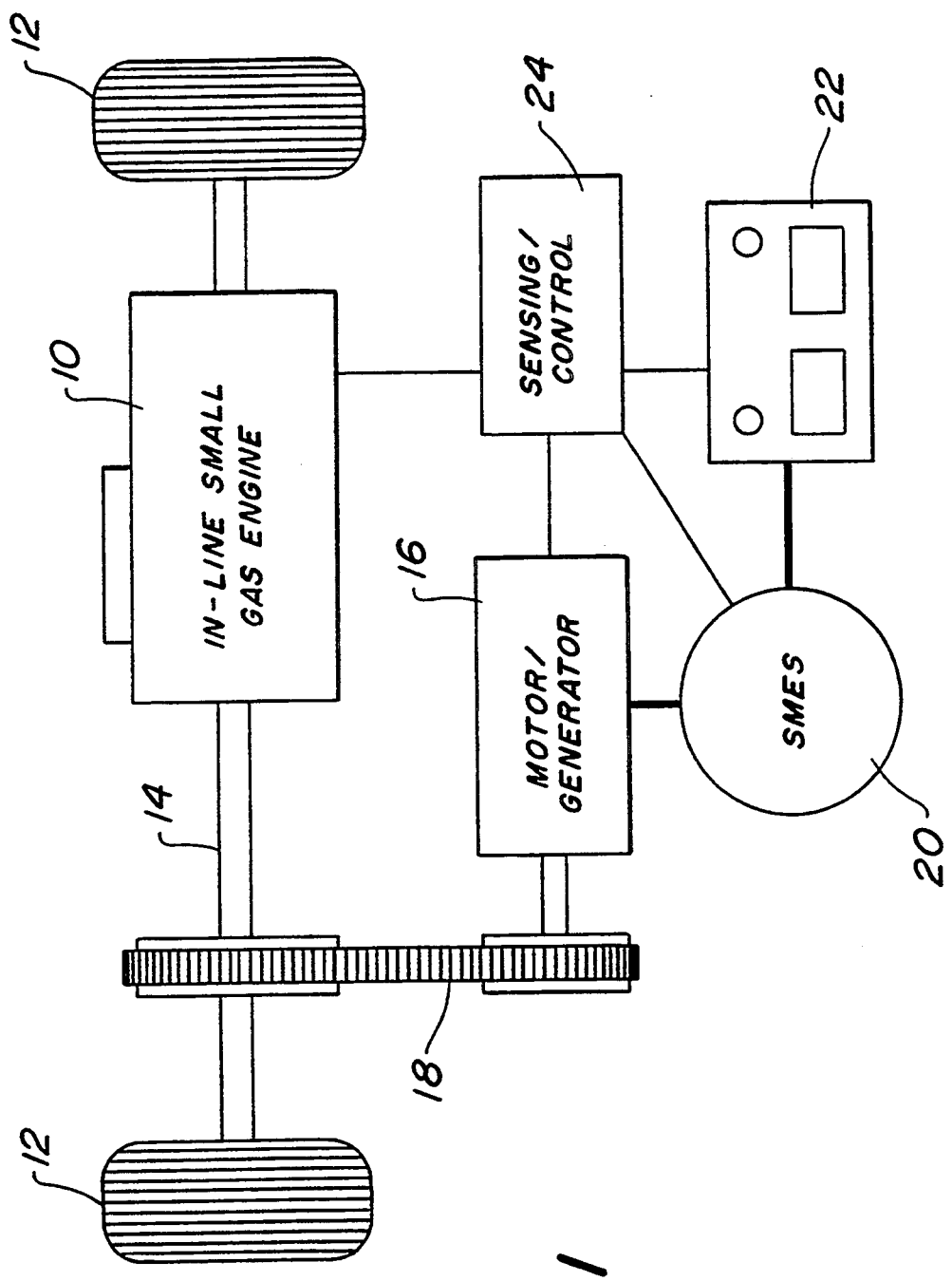
FIG. 1 is a simplified schematic diagram of a vehicle energy management system according to the present invention, showing the physical interrelationship between the invention and a hybrid internal combustion and electric vehicle.

Referring now to the drawings, wherein like numerals indicate like elements, there is shown in FIG. 1 a simplified schematic diagram of a vehicle energy management system according to the present invention. FIG. 1 shows the physical interrelationship between the vehicle energy management system according to the invention and a hybrid internal combustion and electric vehicle. The hybrid vehicle includes a small (e.g., 30 hp) internal combustion engine 10, such as a small in-line gasoline engine. Engine 10 is coupled to vehicle drive wheels 12 connected to a common drive shaft 14. Engine 10 may be coupled to drive wheels 12 via drive shaft 14 either directly or, preferably, via a transmission or transaxle (not shown). Engine 10 is not run at a constant speed, but is controlled by an accelerator just as in a normal internal combustion engine vehicle. Engine 10 thus supplies drive power to drive wheels 12 and also, as described below, drives a charger generator for charging a vehicle battery.

An electric machine in the form of motor/generator 16 is also connected to drive wheels 12 via drive shaft 14 by a suitable coupling 18. Coupling 18 may be a direct coupling or, preferably, may be a transmission. The coupling ratio of coupling 18 is chosen to provide a step-down speed from motor/generator 16 to drive wheels 12 so that motor/generator current during acceleration and braking can be kept within acceptable safe limits. As those skilled in the art will appreciate, motor/generator 16 acts as a traction motor when driven from a source of electric current, and acts as an electric generator when driven mechanically.

Motor/generator 16 is supplied with electric current by a superconducting magnetic storage device, or SMES, 20 and a battery 22. SMES 20 is preferably, although not necessarily, a high-temperature superconducting magnetic energy storage device, and is known per se in the art. SMES 20 can be cooled to the required superconducting temperature by an inexpensive and environmentally-clean liquid nitrogen reservoir with an estimated refilling period of about two weeks. SMES 20 is capable of charging or discharging very quickly without energy loss, and makes possible good vehicle performance at high efficiency. Battery 22 is preferably a bank of individual high-capacity storage batteries, but may, if desired, comprise a single battery.

A sensing and control unit 24 is connected to motor/generator 16, SMES 20 and battery 22. Sensing and control unit 24 receives as inputs sensor signals from one or more sensors which monitor a particular vehicle condition, as will be described in more detail below, and processes the sensor inputs to generate one or more control signals to motor/generator 16 and SMES 20, as will also be described in more detail.

Although not illustrated in FIG. 1, it is contemplated that the hybrid vehicle also comprises an accelerator pedal or other accelerator operator and a brake pedal or other brake operator. Thus, for example, although the following discussion will assume that the vehicle is equipped with more or less conventional accelerator and brake pedals, other operators such as levers or handles may be used without departing from the invention.

It is presently contemplated that any one or any combination of four specific vehicle conditions should be sensed, although more or other vehicle conditions may be sensed without thereby departing from the scope of the invention. Presently, it is preferred to sense the state of the vehicle accelerator pedal, the state of the vehicle brake pedal, the charge level of battery 22, and the amount of energy stored in SMES 20.

Figure 2:
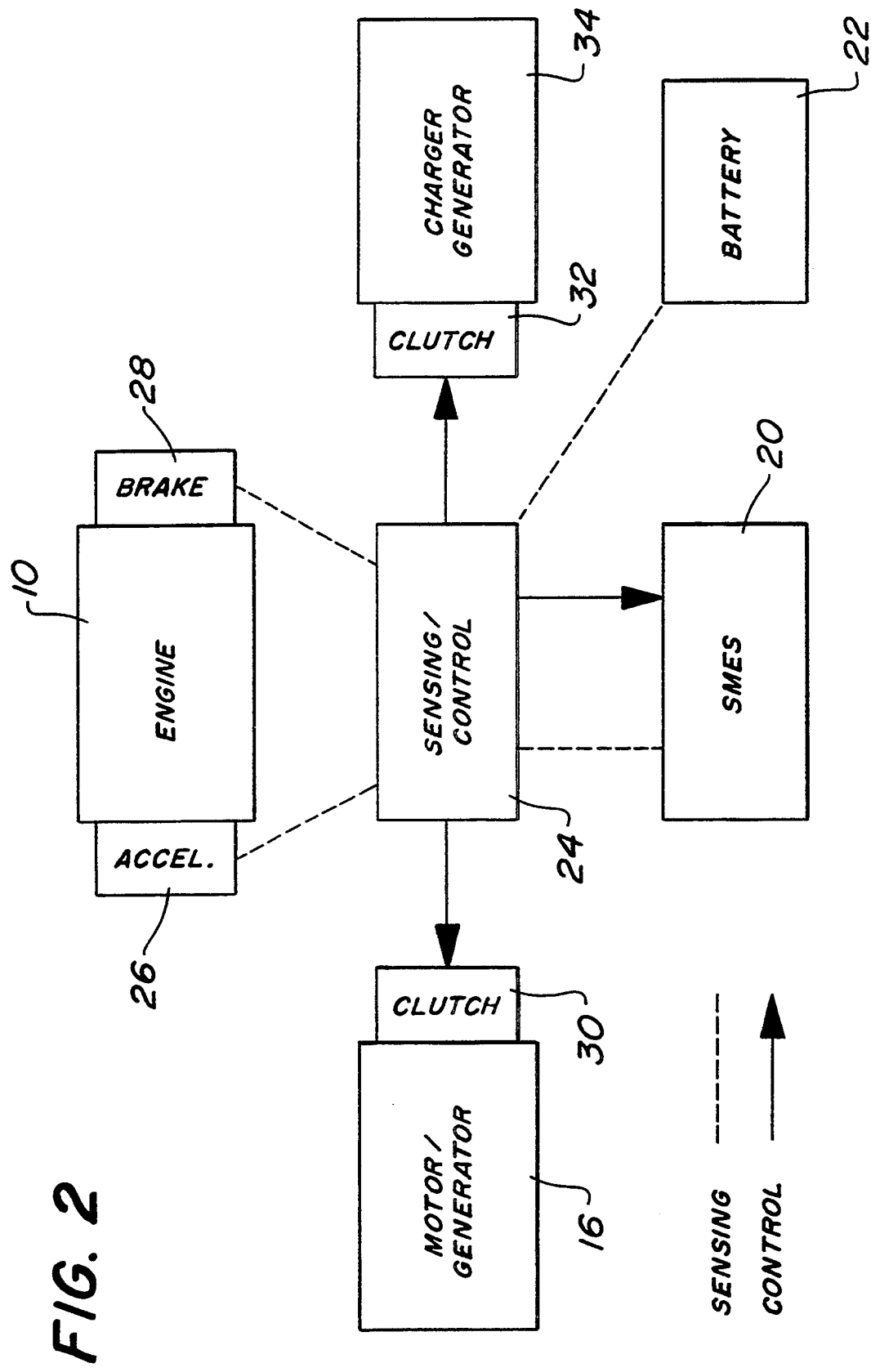
FIG. 2 is a block diagram of the energy management system of FIG. 1, illustrating the electrical and signal flow interrelationship of the elements of the invention and the hybrid vehicle.

Referring now to FIG. 2, accelerator 26 and brake 28 are shown connected to a sensing and control unit 24 by a dashed line, which is used herein to indicate a sensor signal input to sensing and control unit 24 from suitable sensors (not shown) associated with accelerator 26 and brake 28. SMES 20 and battery 22 are also shown connected to sensing and control unit 24 by dashed lines, indicating sensor signal inputs to sensing and control unit 24 from suitable sensors (not shown) associated with those components as well.

Specific sensors are not illustrated in the figures, since the specific sensors used are not critical to the present invention. Thus, any suitable known sensors may be used to sense the physical positions of the accelerator and brake pedals, and to sense the charge levels of the battery and the SMES. The extent to which the accelerator and brake pedals are depressed could, for example, be sensed by simple potentiometer sensors mechanically connected to the pedals. An internal series resistance sensor could be used to monitor the state of the battery, and the amount of energy stored in the SMES can be determined by sensing the current or the magnetic field. These examples are only illustrative of the types of sensors that can be used, and should not be construed as in any way limiting the invention to any particular sensors.

Sensing and control unit 24 preferably includes a microprocessor, which can readily be programmed as required to receive and process the sensor inputs and generate therefrom the control outputs. Control outputs are shown in FIG. 2 as solid arrows. Control outputs are applied to a clutch 30 on motor/generator 16 and to a clutch 32 on a battery-charging generator 34. Clutch 30 controls the connection between motor/generator 16 and drive shaft 14, while clutch 32 controls the connection between battery-charging generator 34 and engine 10. Preferably, although not necessarily, clutches 30 and 32 are electromechanical clutches which can be operated by electrical control signals to engage and disengage mechanical linkages.

A control output is also applied to SMES 20 to signal the SMES to perform either one or a combination of the following actions:

(1) draw energy slowly from battery 22, at a discharge rate selected for maximum efficiency of battery 22;
(2) slowly charge battery 22, at a charging rate selected for maximum battery efficiency;
(3) supply energy at a very rapid rate to the motor/generator during vehicle acceleration; and
(4) store energy generated by the motor/generator during braking at a rapid rate.

The specific program for the microprocessor and the specific form of the control signals will vary, depending upon the particular hardware employed in a given vehicle. Thus, these details are not critical to the present invention, and those skilled in the art will understand how to program the microprocessor and generate the desired control signals without the need for detailed explanation.

Operation of the energy management system will now be described with reference to the accompanying flowchart, which illustrates one way of carrying out the invention. In the flowchart, the abbreviations used have the following meaning:

| Sensed vehicle parameter: | |
| --- | --- |
| $S_{AC}$ | state of the accelerator 26 |
| $S_{BR}$ | state of the brake 28 |
| $S_{BA}$ | state (charge level) of battery 22 |
| $S_{SM}$ | state (charge level) of SMES 20 |
| Controlled element: | |
| MGC | motor/generator clutch 30 |
| CGC | charger generator clutch 32 |
| SMES controlled energy flow action: | |
| SMeMG | SMES supplies energy to motor/generator |
| MGeSM | motor/generator charges SMES with energy |
| SMeBA | SMES slowly charges battery |
| BAeSM | battery slowly supplies energy to SMES |

Upon starting the vehicle ("Start Engine"), the state of each of the desired vehicle conditions is determined by the appropriate sensor. The state of the accelerator ("$S_{AC}$"), the state of the brake ("$S_{BR}$"), the state of the battery ("$S_{BA}$"), and the state of the SMES ("$S_{SM}$") are thus determined by reading the sensor signals from the sensors associated with those elements. The state of the accelerator is defined as the degree to which the pedal is depressed, and may for convenience be represented by a range of numbers between 0 and 1, where 0 represents not depressed and 1 represents fully depressed. However, other ways of representing the state of the accelerator may be used without departing from the invention. Similarly, the state of the brake is defined as the degree to which the brake pedal is depressed, and it may also for convenience be represented on a scale of 0 to 1, with 0 representing not depressed and 1 representing fully de-pressed. The state of the battery is defined as the charge level of the battery, and can for convenience be represented on a scale of 0 to 1, with 0 representing no energy stored and 1 representing a full charge (i.e., charged to 100% of capacity). The state of the SMES is similarly defined as the level of energy stored in the SMES, which can likewise for convenience be represented on a scale of 0 to 1, with 0 representing no stored energy and 1 representing 100% of capacity. As with the signal representative of the state of the accelerator, other ways of representing the sensed parameter can be employed, such as binary or digital coding, within the scope of the invention.

Figure 3:
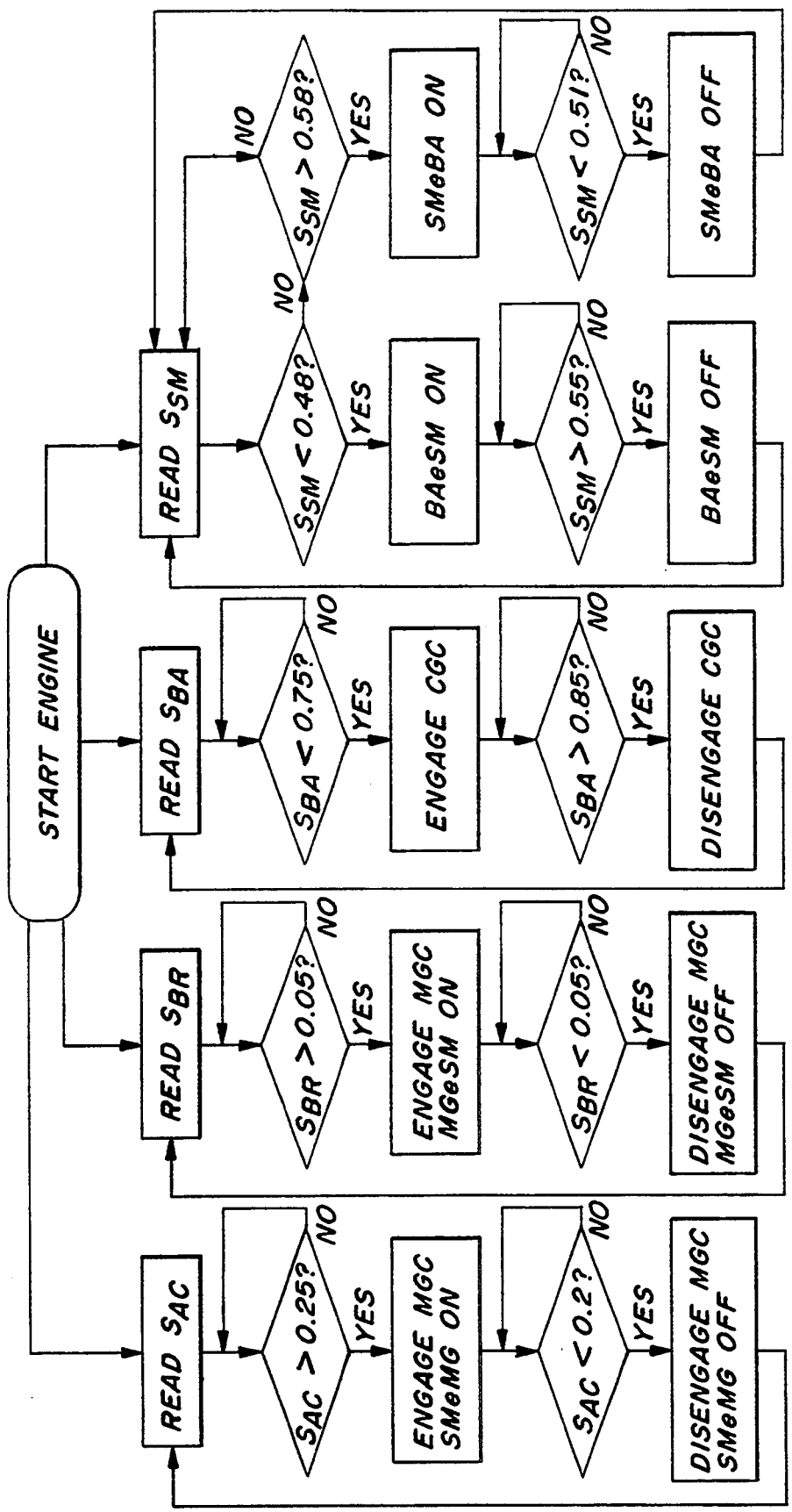
FIG. 3 is a flow chart illustrating the operation of the management system shown in FIGS. 1 and 2.

In the flow chart of FIG. 3, each flow loop is executed independently of the others. Accordingly, each flow loop will be separately described herein.

In the accelerator loop, the state of the accelerator is read and compared in the microprocessor to a fixed reference. Preferably, when the vehicle is first started all clutches are disengaged and all actions are off. If $S_{AC}$ is not greater than 0.25 and the motor/generator clutch has not been engaged, as will be the condition at start-up, no action is executed by the accelerator loop. In this situation, drive power to drive wheels 12 is provided solely by engine 10. When $S_{AC}$ exceeds 0.25, this is interpreted as calling for additional power, in addition to that provided by engine 10, to accelerate the vehicle. Consequently, a control signal is sent from sensing and control unit 24 to motor/generator clutch 30 to cause the clutch to be engaged. At the same time, a control signal is sent from sensing and control unit 24 to SMES 20, signalling it to supply energy stored therein to motor/generator 16. In this case, motor/generator 16 acts as a traction motor which supplies additional drive power to drive shaft 14 to supplement the power supplied by engine 10. It is anticipated that engine 10, being small, will reach its maximum output at about $S_{AC}=0.25$ or 0.30, and thus the system is designed to supplement engine 10 only when greater acceleration is called for. As long as $S_{AC}$ is less than about 0.25, the vehicle is accelerated or kept in motion only by engine 10.

After motor/generator clutch 30 has been engaged and SMES 20 has begun to supply power to motor/generator 16, no further actions are executed as long as $S_{AC}$ is greater than 0.2. However, if $S_{AC}$ drops below 0.2, motor/generator clutch 30 is disengaged and no further energy is supplied from SMES 20 to motor/generator 16. Unless the brake is applied, the vehicle will maintain speed or coast, depending on the state of the accelerator, powered only by engine 10.

In the brake loop, the state of the brake is read and compared to a fixed reference in the microprocessor. If motor/generator clutch 30 has not yet been engaged, as at startup, no action is executed until $S_{BR}$ exceeds 0.05. Once that threshold has been reached, it is interpreted as calling for braking of the vehicle. Consequently, a signal is sent from sensing and control unit 24 to motor/generator 30, causing motor/generator clutch 30 to be engaged and couple drive shaft 14 to motor/generator 16. In this situation, motor/generator 16 operates as a generator driven by drive shaft 14, and converts kinetic energy of the vehicle into electrical energy which can be stored. The energy generated during braking is fed to SMES 20, where it is stored for use in a subsequent acceleration cycle.

Once the brake is released after a prior braking operation, no actions are executed until the state of the brake falls below 0.05 (i.e, the brake pedal is less than 5% depressed). At that point, it is assumed that braking has been completed. In that case, motor/generator clutch 30 is disengaged, and no further energy is fed from motor/generator 16 to SMES 20.

It will be seen that the accelerator loop and the brake loop accomplish several functions. During acceleration and cruising, electrical energy stored in SMES 20 is supplied to motor/generator 16 to provide drive power to drive wheels 12 to supplement the power supplied by engine 10. Since SMES 20 is capable of discharging energy at a very rapid rate, rapid acceleration can be obtained, resulting in a highly agile vehicle. During braking, the kinetic energy of the vehicle can be recovered by motor/generator 16 and stored in SMES 20 for future use. Since SMES 20 is capable of being charged at an equally rapid rate, substantially all of the vehicle's kinetic energy can be recovered and stored as electromagnetic energy in SMES 20. For example, a 2000-pound vehicle moving at 50 mph has 222 kJ (or 5 ampere-hours) of kinetic energy. This is approximately the amount of energy that can be recovered and stored during braking and reused for acceleration.

This mode of operation enables the battery to be charged and discharged at a relatively slow rate, compatible with maximum battery efficiency (and therefore compatible with maximum overall vehicle efficiency). By rapidly drawing energy from SMES 20 during acceleration, it becomes unnecessary to rapidly discharge battery 22. Likewise, by rapidly storing energy in SMES 20 during braking, it becomes unnecessary to rapidly charge battery 22. By avoiding rapid charging and discharging of battery 22, battery efficiency is maximized.

The state of battery 22 is monitored and controlled by the battery loop, which will now be described with continued reference to FIG. 3. At startup, the charge level of battery 22 is measured and compared to a fixed reference in the microprocessor. If charger generator clutch 32 has not yet been engaged, as will be the case at startup, and the charge level of battery 22 is not less than 75%, no actions are executed. If, however, the charge level is less than 75%, then charger generator clutch 32 is engaged, and the battery is charged by charger generator 34 at a rate compatible with maximum battery efficiency. Battery 22 is charged and discharged through sensing and control unit 24 to ensure that battery 22 is charged and discharged at the optimum rates. After charger generator clutch 32 has been engaged, the state of battery 22 is continually monitored. If the charge level of battery 22 remains below 85%, charger generator clutch 32 remains engaged, battery 22 continues to charge, and no further actions are executed. If the charge level of battery 22 rises above 85%, however, charger generator clutch 32 is disconnected, and no further charge is fed to battery 22. Consequently, the charger generator will not charge battery 22 beyond 85% of capacity, although SMES 20 is permitted to continue to charge battery 22 without limit.

The final loop in the flow chart of FIG. 3 is the SMES loop. At startup, the charge level of SMES 20 is measured and compared to a fixed reference in the microprocessor. If the charge level of SMES 20 is between 48% and 58%, no further actions are executed. If the charge level is less than 48%, however, SMES 20 is charged by battery 22. The rate at which battery 22 is discharged to SMES 20 is chosen to be compatible with maximum battery efficiency. SMES 20 continues to be charged by battery 22 until the charge level of SMES 20 reaches 55%. At that point, charging of SMES 20 by battery 22 is stopped.

If, at startup, the charge level of SMES 20 exceeds 58%, energy is transferred from SMES 20 to battery 22. Battery 22 is charged by SMES 20 at a charging rate compatible with maximum battery efficiency, as when battery 22 is charged by charger generator 34. Battery 22 continues to be charged by SMES 20 until the charge level of SMES 20 drops below 51%. At that point, charging of battery 22 by SMES 20 is stopped. It will be seen that the SMES loop serves to maintain SMES 20 approximately half-charged.

The numerical ranges just described are chosen subjectively, and different ranges can be chosen if desired, consistent with the following objectives.

The SMES needs to be prepared to either receive energy from or supply energy to the motor/generator at all times. This requirement can be met very simply by maintaining the SMES half charged, although this may not be the most efficient use of the SMES's capacity. To prevent the SMES from being charged an discharged too frequently at the 50% level, some leeway is given when setting limits. The numerical limits of 48%, 51%, 55%, and 58% are subjectively chosen to provide that leeway. As an alternative to a half-charged setting on the SMES, a computerized SMES charge control system can be employed to adjust the charge level according to a next-action forecast (to brake or to accelerate) determined from vehicle status data (speed, load, uphill or downhill inclination, and so forth).

The battery, meanwhile, not only exchanges energy with the SMES, but also supplies energy for vehicle accessories such as lights, radio, and so on. Hence, a secondary charger in the form of the charger generator is needed for the battery. Conventional charging systems used in vehicles are always on, and the battery is usually fully-charged all the time. This is not energy efficient. In the present invention, a clutch is used to engage the charger only when the battery level falls below a preset limit. A limit (such as 75%) is subjectively chosen for two reasons: (1) a battery at less than 100% charge is needed for good charging efficiency, and (2) ample energy storage room in the battery needs to be reserved in order to store energy expected to be received from the SMES during braking. As an example, 20% of the storage room of a standard 200 ampere-hour automotive battery would be sufficient to store the energy recovered from eight full brakings of a 2000 pound vehicle. The range between 75% and 85% is to avoid frequent engaging and disengaging of the charger generator clutch. If desired, temporarily disengaging the charger clutch when the vehicle is accelerating can be done within the flow chart of FIG. 3 without departing from the basic flow, as those skilled in the art will appreciate.

Optional functions, such as a power-off sequence, can be added to disengage all clutches, stop all energy flows, and move any remaining energy stored in SMES 20 to battery 22 immediately before power off. Additionally, sensing and control unit can be programmed to provide a built-in anti-lock brake feature for effective braking and efficient energy recovery. Such additional optional functions are in addition to the present invention, and are not necessary in order to fall within the scope of the invention. Such additional features and how they can be implemented will be readily apparent to those skilled in the art.

The present invention thus provides an energy management system for a hybrid vehicle which offers numerous advantages, many of which are not available in known hybrid vehicles:
  managed energy flow, eliminating waste;
  high energy efficiency;
  environmentally clean;
  high fuel economy;
  high degree of mobility and agility;
  light weight;
  affordable;

As an example, a hybrid vehicle according to the invention may be equipped with only a 30 hp engine. (Most passenger cars do not require more than 20 horsepower for cruising at 55 mph, and larger amounts of power are needed only for acceleration and climbing hills.) A 200 kJ SMES unit, a 50 hp burst motor/generator, and a standard 200 ampere-hour automotive battery in conjunction with a 30 hp engine would be sufficient for a 2000 pound vehicle. It is anticipated that such a vehicle will have 70 mpg fuel economy, while being able to accelerate from zero to 60 mph in twelve seconds.

The present invention may be embodied in other specific forms without departing from the spirit or essential attributes thereof and, accordingly, reference should be made to the appended claims, rather than to the foregoing specification, as indicating the scope of the invention.

We claim:

1. An energy management system for a hybrid internal combustion and electric vehicle having an internal combustion engine, an electric motor/generator and at least one electric storage battery for storing and dispensing energy, comprising
   a sensing and control unit having as an input thereto at least one sensor signal representative of a preselected vehicle parameter and generating as an output a control signal in response to said at least one sensor signal, said sensing and control unit being electrically connected to said motor/generator and said battery, and
   a magnetic energy storage device for storing and dispensing energy and being connected to said sensing and control unit and to said motor/generator and said battery through said sensing and control unit, said device being operated by said control signal to selectably draw energy from said battery at a rate compatible with maximum battery efficiency, charge said battery at said rate, supply energy to said motor/generator, and store energy from said motor/generator, in response to said control signal.

2. An energy management system as in claim 1, wherein the magnetic energy storage device is a superconducting magnetic energy storage device.

3. An energy management system as in claim 1, wherein the magnetic energy storage device is a high-temperature superconducting magnetic energy storage device.

4. An energy management system as in claim 1, wherein said preselected vehicle parameter is the state of an accelerator control.

5. An energy management system as in claim 1, wherein said preselected vehicle parameter is the state of a brake control.

6. An energy management system as in claim 1, wherein said preselected vehicle parameter is the state of charge of the electric storage battery.

7. An energy management system as in claim 1, wherein said preselected vehicle parameter is the state of charge of the magnetic energy storage device.

8. An energy management system as in claim 1, wherein said sensing and control unit has as inputs thereto plural sensor signals representative of the state of an accelerator control, the state of a brake control, the state of charge of the electric storage battery, and the state of charge of the magnetic energy storage device.

9. An energy management system for a hybrid internal combustion and electric vehicle having an internal combustion engine, an electric motor/generator and at least one electric storage battery for storing and dispensing energy, said system comprising a sensing and control unit and a superconducting magnetic energy storage device, said sensing and control unit being connected to said motor/generator, said battery and said storage device, said sensing and control unit having as an input thereto at least one sensor signal representative of a preselected sensed vehicle condition, said sensing and control unit selectably charging said battery at a charging rate compatible with maximum battery efficiency, discharging said battery at a discharging rate also compatible with maximum battery efficiency, causing said storage device to store energy from said motor/generator, and causing said storage device to supply stored energy to said motor/generator, in response to said sensed vehicle condition.

10. An energy management system as in claim 9, wherein said preselected vehicle condition is the state of an accelerator control.

11. An energy management system as in claim 9, wherein said preselected vehicle condition is the state of a brake control.

12. An energy management system as in claim 9, wherein said preselected vehicle condition is the state of charge of the electric storage battery.

13. An energy management system as in claim 9, wherein said preselected vehicle condition is the state of charge of the magnetic energy storage device.

14. An energy management system as in claim 9, wherein said sensing and control unit has as inputs thereto plural sensor signals representative of the state of an accelerator control, the state of a brake control, the state of charge of the electric storage battery, and the state of charge of the magnetic energy storage device.

15. A hybrid electric vehicle, comprising
an internal combustion engine for supplying a portion of motive power for said vehicle, said engine being controlled by an accelerator to cause power output of said engine to vary between preselected limits,
an electric motor/generator for supplying a portion of motive power for said vehicle,
an electric storage battery for storing and dispensing energy,
a superconducting magnetic energy storage device for storing and dispensing energy,
a brake for braking said vehicle,
a sensing and control unit having as inputs thereto sensor signals representative of the state of the accelerator, the state of the brake, the amount of energy stored in the battery and the amount of energy stored in the superconducting magnetic energy storage device and generating as outputs control signals in response to said sensor signals, and
control devices responsive to said control signals and associated with said motor/generator and superconducting magnetic energy storage device for selectably causing (1) said superconducting magnetic energy storage device to supply energy to said motor/generator, (2) said motor/generator to charge said superconducting magnetic energy storage device with energy from said motor/generator, (3) said superconducting magnetic energy storage device to charge said battery at a charging rate compatible with maximum battery efficiency, and (4) said battery to supply energy to said superconducting magnetic energy storage device at a discharge rate compatible with maximum battery efficiency.

16. A hybrid electric vehicle according to claim 15, wherein the superconducting magnetic energy storage device is a high temperature superconducting magnetic energy storage device.

17. An energy producing and storage system for a hybrid electric vehicle, comprising
an internal combustion engine for generating energy for providing a portion of motive power for said vehicle, said engine being controlled by an accelerator to cause energy generated by said engine to vary between preselected limits,
an electric motor/generator for supplying a portion of motive power for said vehicle when operated as a motor and for converting kinetic energy of the vehicle to electricity when operated as a generator,
an electric storage battery for storing and dispensing energy,
a charger generator driven by said engine for maintaining the charge in said battery at a predetermined level,
a superconducting magnetic energy storage device for storing and dispensing energy,
a brake for braking said vehicle,
a sensing and control unit having as inputs thereto sensor signals representative of the state of the accelerator, the state of the brake, the amount of energy stored in the battery and the amount of energy stored in the superconducting magnetic energy storage device and generating as outputs control signals in response to said sensor signals, and
control devices responsive to said control signals and associated with respective ones of said motor/generator, charger generator and superconducting magnetic energy storage device for selectably causing
(1) said superconducting magnetic energy storage device to supply energy to said motor/generator to drive said motor/generator as a motor when the accelerator is depressed,
(2) said motor/generator to operate as a generator and convert vehicle kinetic energy to electrical energy and charge said superconducting magnetic energy storage device with said energy from said motor/generator during vehicle braking,
(3) said superconducting magnetic energy storage device to charge said battery at a charging rate compatible with maximum battery efficiency, and
(4) said battery to supply energy to said superconducting magnetic energy storage device at a discharge rate compatible with maximum battery efficiency, and
(5) said charger generator to charge said battery when the level of charge in the battery falls below a first preselected limit and to cease charging the battery when the level of charge in the battery rises above a second preselected limit.

18. A hybrid electric vehicle according to claim 17, wherein the superconducting magnetic energy storage device is a high temperature superconducting magnetic energy storage device.

* * * * *